United States Patent [19]

Bean et al.

[11] 4,022,331
[45] May 10, 1977

[54] ANHYDROUS AMMONIA TANK CARRIER FOR FARM TRACTORS

[76] Inventors: Roland C. Bean; Bruce L. Bean, both of Star Rte., Burley, Idaho 83318

[22] Filed: Sept. 8, 1975

[21] Appl. No.: 611,178

[52] U.S. Cl. .............................. 214/1 R; 187/9 R; 214/75 R; 214/147 G; 214/DIG. 12; 222/176
[51] Int. Cl.² .......................................... B65P 1/00
[58] Field of Search .......... 214/394, 396, 1 D, 1 R, 214/147 G, 147 R, 658, 650 R, 651–654, 75 R, DIG. 12; 254/2 R, 3 R, 93 R; 244/118 R; 187/9 R; 280/481; 222/176, 177

[56] References Cited

UNITED STATES PATENTS

| | | | |
|---|---|---|---|
| 2,491,967 | 12/1949 | Ghant | 214/396 |
| 2,772,010 | 11/1956 | Buehring | 214/394 |
| 3,045,853 | 7/1962 | Card, Sr. | 214/672 |
| 3,311,349 | 3/1967 | Loebetal | 254/93 R |
| 3,721,358 | 3/1973 | Brock | 214/394 |
| 3,900,201 | 8/1975 | Johnson et al. | 280/481 X |

FOREIGN PATENTS OR APPLICATIONS

| | | | |
|---|---|---|---|
| 622,864 | 6/1961 | Canada | 222/176 |

*Primary Examiner*—Frank E. Werner
*Attorney, Agent, or Firm*—Oliver D. Olson

[57] ABSTRACT

A tank carrier for releasably mounting an anhydrous ammonia tank on a farm tractor includes a pair of relatively movable tank support members by which a tank is raised from the ground and held firmly against lateral displacement. In one form of the invention one of the support members of the pair comprises a pair of laterally spaced fluid pressure cylinders arranged to engage and elevate a tank from the ground, and the other support member of the pair comprises a pair of plates having contoured edges matching the confronting periphery of the tank. In another form of the invention one of the support members of the pair comprises a pair of pivoted plates arranged at the end opposite the pivot to engage and elevate a tank from the ground and having an edge portion confronting the tank contoured to the periphery of the tank, and the other support member of the pair comprises a clamp member on each pivoted plate arranged to pivot into engagement with the tank opposite the confronting edge portion of the associated plate, to receive the tank.

6 Claims, 9 Drawing Figures

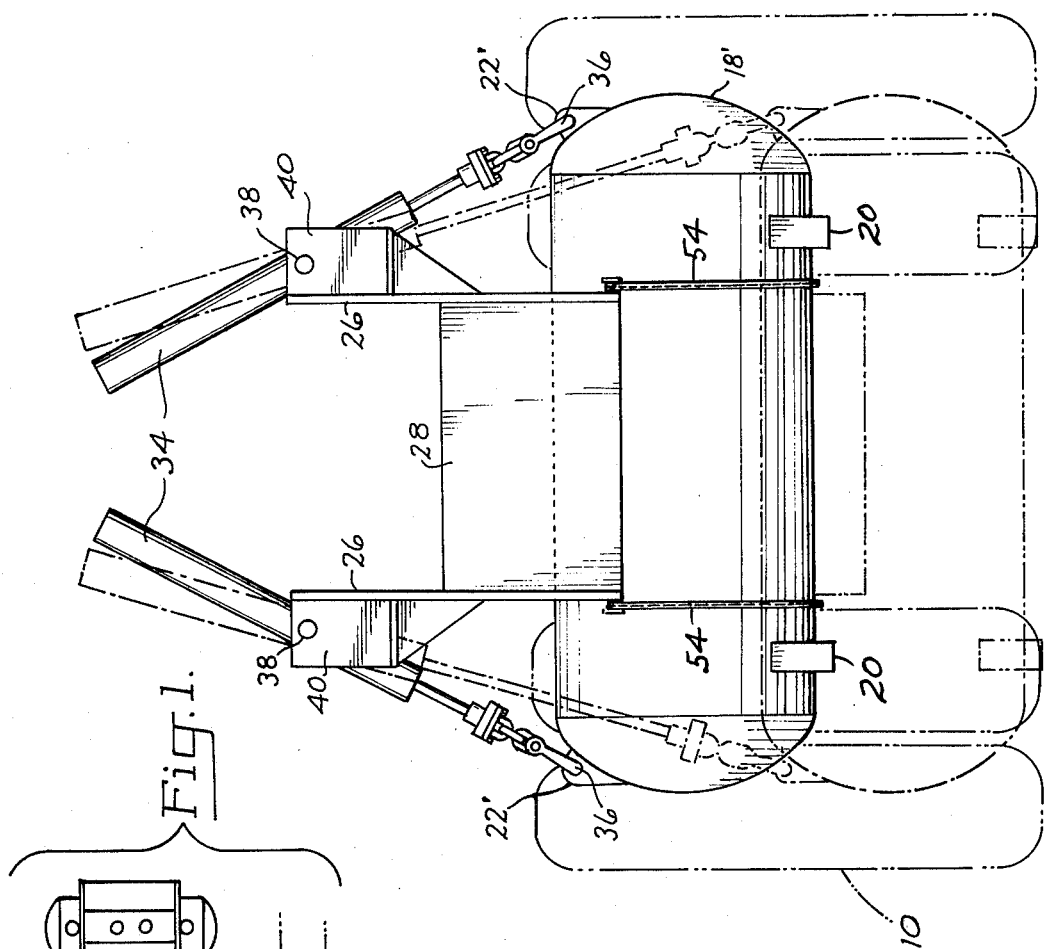
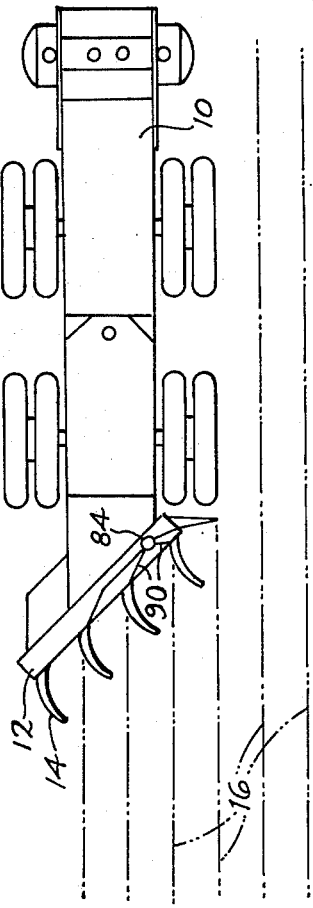
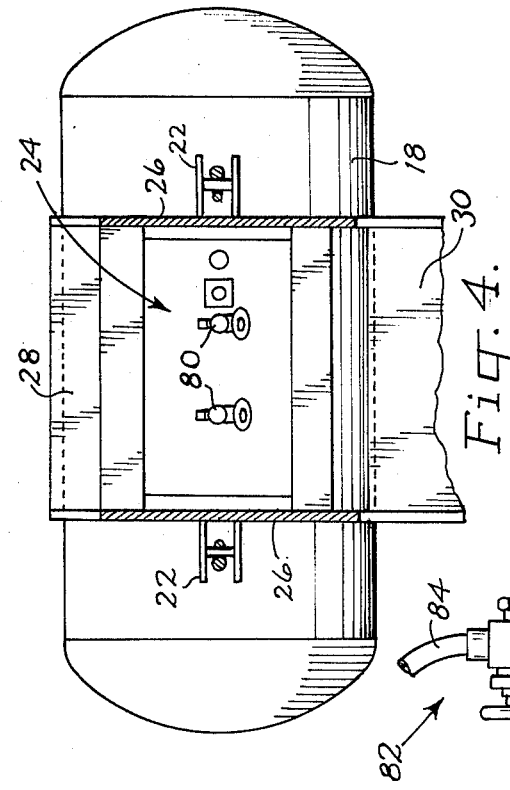

ANHYDROUS AMMONIA TANK CARRIER FOR FARM TRACTORS

BACKGROUND OF THE INVENTION

This invention relates to a tank carrier for releasably mounting an anhydrous ammonia tank forwardly of the tractor.

The plow down application of anhydrous ammonia has heretofore become quite common for preplanting fertilization. For this purpose, ammonia is quite commonly deployed from tanks mounted on the tractor through hoses trailing in the furrows. As the soil is turned over by the trailing plows, the ammonia is trapped and absorbed into the soil.

Heretofore small transfer tanks have been utilized on the tractor and the ammonia is transferred thereto from the large ammonia supply tanks. The transfer involves considerable danger to the operator as the anhydrous state of ammonia causes severe burns upon contact with the skin. Also, the transfer operation results in considerable evaporative ammonia loss, usually at least 4%, as the transfer tank must necessarily be left open to the atmosphere during filling in order to bleed air therefrom. Furthermore, since the transfer tanks are relatively small, they must be refilled frequently, requiring considerable tractor down time. In addition, the tractor must be transported from its field location to the supply tank for each refilling, causing additional time loss.

SUMMARY OF THE INVENTION

In its basic concept, the tank carrier of this invention involves the cooperative arrangement of a pair of relatively movable tank support members in which one functions to raise and lower the tank and the other functions to engage and secure the tank against lateral displacement when in said raised position.

It is by virtue of the foregoing basic concept that the principal objective of this invention is achieved; namely, to overcome the aforementioned disadvantages and limitations of prior tank carriers.

Another object of this invention is to provide a tank carrier of the class described wherein the tank may be secured quickly without the aid of external lifting devices.

Still another object of this invention is to provide a tank carrier of the class described which is configured to accommodate tanks having lifting tabs which are positioned at various longitudinal locations.

Still another object of this invention is to provide a tank carrier of the class described which is adaptable for mounting on the blade support of front-mounted bulldozer blades.

A further object of this invention is to provide a tank carrier of the class described which is of simplified construction for economical manufacture and is of a rugged design for positive operation and long life.

The foregoing and other objects and advantages of this invention will appear from the accompanying detailed description taken in conjunction with the accompanying drawings of a preferred embodiment.

BRIEF DESCRIPTION OF THE DRAWINGS

FIG. 1 is a schematic plan view of a farm tractor and plow incorporating therewith a tank carrier embodying the features of this invention.

FIG. 4 is a fragmentary sectional view taken on line 4—4 in FIG. 2.

FIG. 5 is a detailed view, in enlarged scale, showing a valved coupling communicating the tank shown in FIG. 4 with an outfeed conduit.

FIG. 6 is a front elevation, similar to that of FIG. 3, showing the tank carrier engaging a tank with end mounted lifting tabs and incorporating a modified form of a tank retaining means.

DESCRIPTION OF A PREFERRED EMBODIMENT

Referring to FIG. 1, the tank carrier of the present invention is intended to be used on a farm tractor 10 being used to plow down ammonia. The tank carrier is positioned forwardly of the tractor which is towing plow 12 having a plurality of depending knives 14, moldboards, or other implements which penetrate the soil to create furrows. The ammonia is placed in the furrows concurrently with the plowing, along rows 16 shown by the dashed lines.

Figure 3:
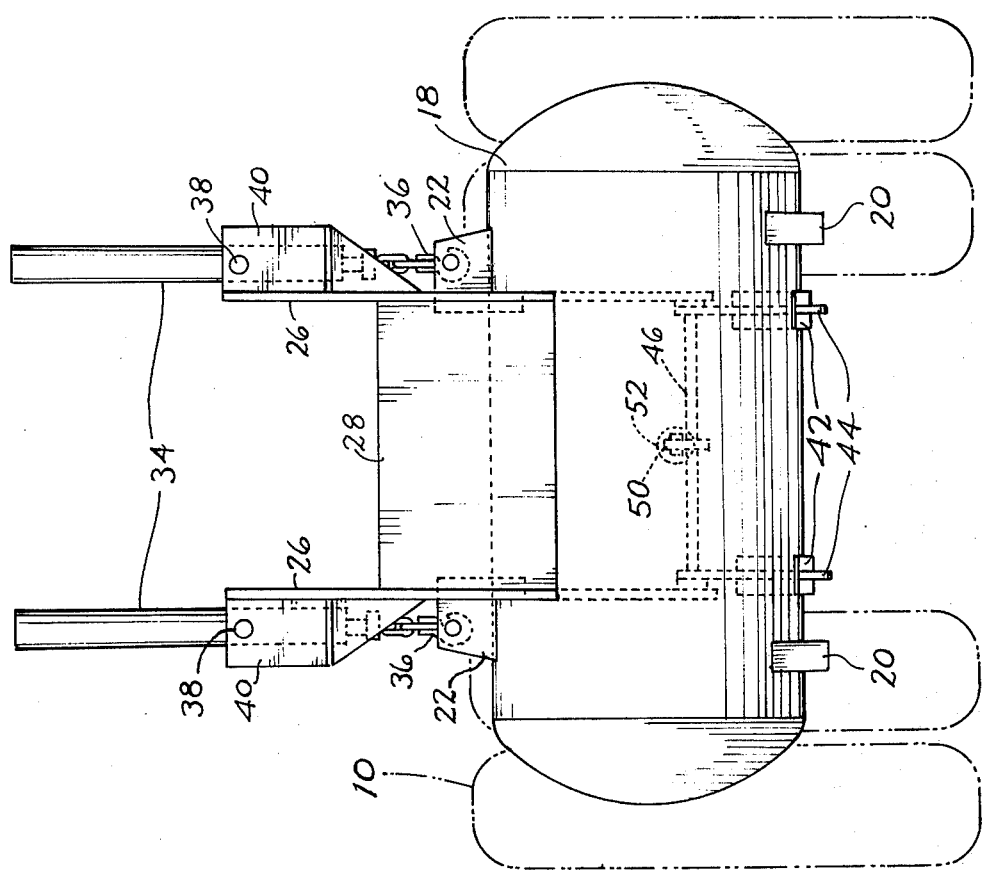
FIG. 3 is a front elevation as viewed from the right in FIG. 2.

Tank 18 is a standard supply tank for anhydrous ammonia. It comprises a closed cylinder with support pads 20 (FIGS. 2 and 3), lifting tabs 22, arcuate guards 22' and controls 24 (FIG. 4). The lifting tabs are generally located symmetrically on the upper portion of the tank (FIGS. 3 and 4); however, some tanks have end tabs 22' located at each upper end portion of the tank, as illustrated by tank 18' in FIGS. 6 and 7.

Figure 2:
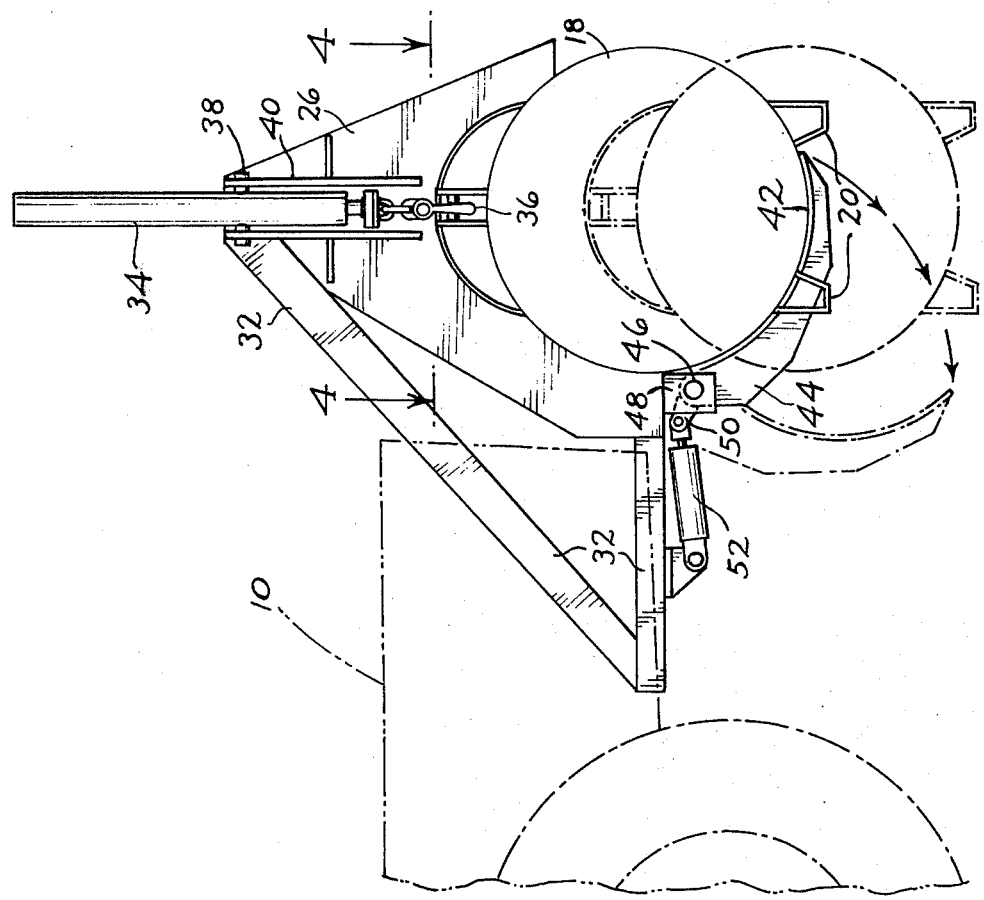
FIG. 2 is a side elevation view of the tank carrier of FIG. 1 with a tank positioned therein.

In the embodiment of the invention illustrated in FIGS. 1–7, the tank carrier includes a pair of tank supports 26 disposed one at each side of the tractor, so that they are spaced to fit over the arcuate guards 22' adjacent tabs 22 of the tank. In the embodiment illustrated, the tank supports are fabricated from a pair of steel plates which are tied together as by welding, in properly spaced relationship by front plate 28 and rear plate 30. The bottom inner edges of the plates are configured arcuately to conform to the confronting guards 22' and adjacent portions of the tank (FIG. 2). They thus contact the inner side and outer top portions of the tank to prevent movement of the tank in any direction other than downwardly.

The tank supports are mounted to the tractor by mounting brackets 32 located on each side of the tractor. They comprise elongated bars joined to the tractor on one end and to the steel plates on the other. Preferably, they are joined to both the upper and lower portions of the plates.

Fluid pressure lifting cylinders 34, preferably hydraulic, are located on the upper portion of the tank supports for lifting the tank to a raised position above ground, nested within the configured bottom edges of the plates. They include hooks 36 mounted by swivel connectors to the piston rods of the cylinders. The hooks are arranged to engage tabs 22. Pivot means, such as pins 38, pivotally join the lifting cylinders to bifurcated attachment lugs 40 mounted on the upper portions of tank supports 26. The lifting cylinders may thus be angled to position the hooks outwardly of their normal vertical position, for engagement of end tabs 22' on tanks 18' so equipped, as illustrated in FIG. 6.

Means preferably is provided for assisting the fluid pressure cylinders in maintaining the tank secured to the tank supports and thereby insure against accidental displacement of the tank during movement of the plow assembly over the ground. In the embodiment illustrated in FIGS. 1–5, such means is provided by a pair of laterally spaced clamp arms 42 pivotally connected to the bottom portions of tank supports 26 for rectractable engagement with the underside of the tank (FIG. 2). The arms are arcuately configured to conform to the contour of the bottom portion of the tank. Webs 44 are joined to the outer surfaces of the arcuate support arms to add stiffness and strength. The arms are pivotally joined to the tank support plates 26 by a common pivot shaft 46 journaled in brackets 48 depending from the support plates 26. One end of a lever arm 50 is secured to the shaft 46 intermediate the ends of the latter.

Reciprocative power means, such as hydraulic cylinders 52 (FIG. 2) pivotally interengages the tractor 10 and lever arm 50 for pivotal movement of the clamp arms 42 between a raised position beneath the tank, thus clamping the tank between the arms 42 and the contoured edges of the tank support plates 26, and a lowered position retracted rearward from the tank.

Figure 7:
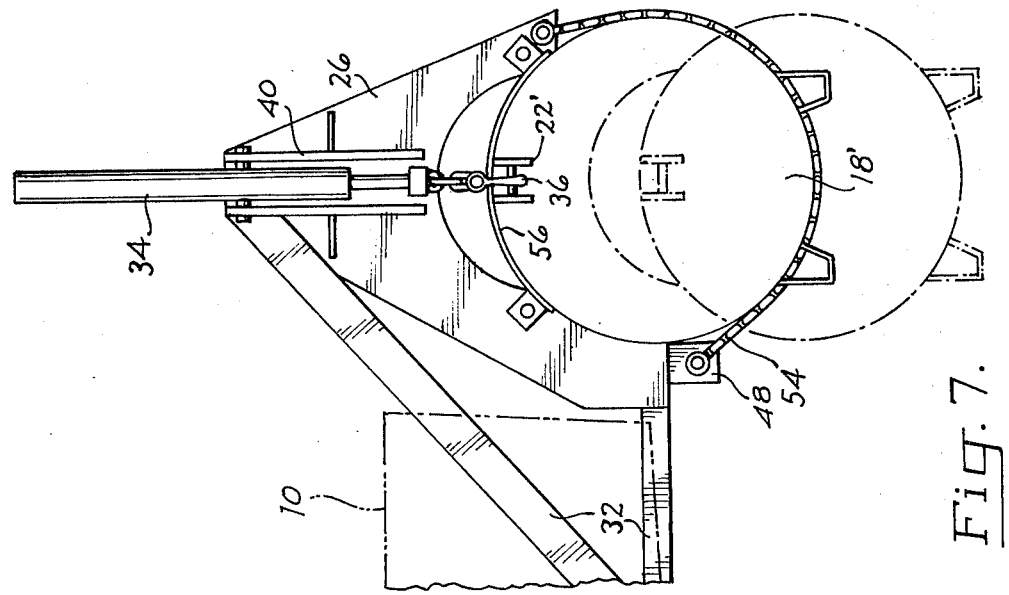
FIG. 7 is a fragmentary side elevation as viewed from the left in FIG. 6.

In the embodiment illustrated in FIGS. 6 and 7, the clamp arms 42 and associated cylinder 52 are omitted, and replaced with a pair of chains 54 secured at their rearward ends to brackets 48. The chains extend forward under the tank 18' and then upward for releasable attachment to forward portions of the plates 26.

It is to be noted, in FIG. 7, that tank 18' is not provided with the arcuate guards 22' of tank 18. Accordingly, an arcuate strap 56, having the same radius as tank 18', is secured to each plate 26 to bridge the smaller contoured portion normally receiving the guards 22'.

Figure 8:
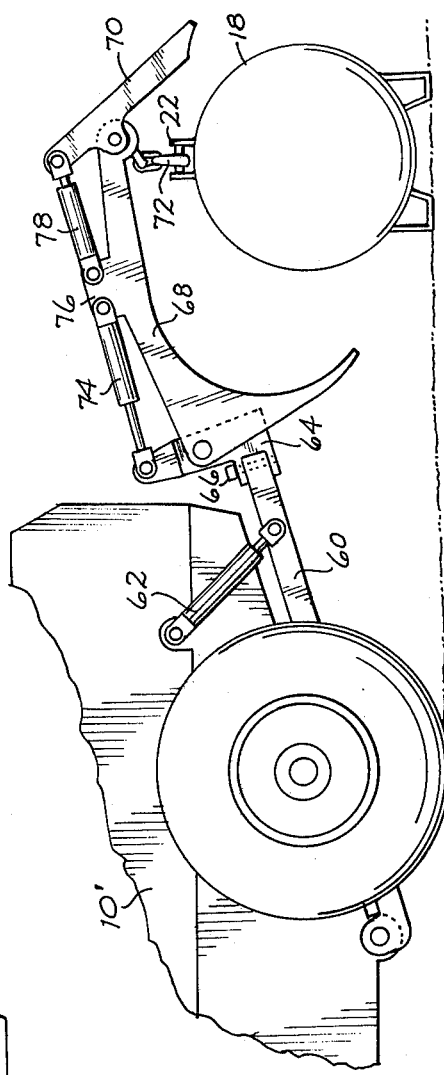
FIG. 8 is a fragmentary view in side elevation illustrating a second form of tank carrier embodying the features of this invention, the same being shown in open position.
Figure 9:
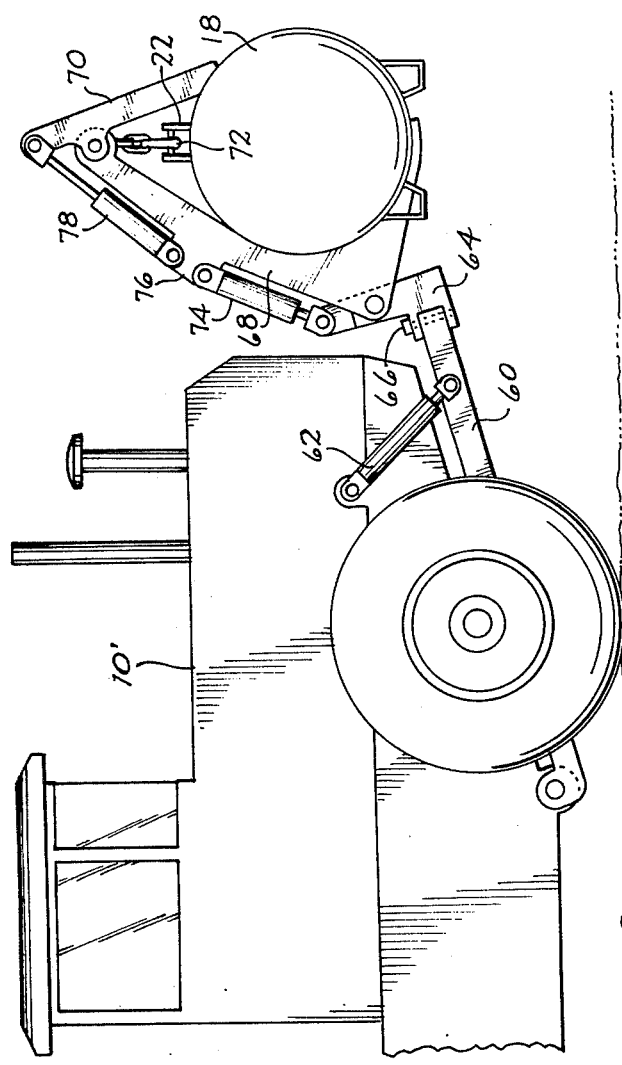
FIG. 9 is a side elevation showing the tank carrier of FIG. 8 in closed position.

In the embodiment illustrated in FIGS. 8 and 9, the tractor 10' is equipped with a pair of blade supports 60 for mounting a bulldozer blade (not shown) for vertical adjustment by hydraulic cylinders 62.

In this embodiment the tank carrier includes a pair of mounting brackets 64 attached to the blade supports, as by bolts 66. A pair of lower tanks supports 68 are pivotally joined at their lower portions one to each of the mounting brackets 64. They comprise L-shaped supports formed from similar steel plate material as tank supports 26. They are contoured on their inner lower and side edge portions to conform to tank 18 so that they engage approximately one quadrant of the tank.

Pivotally attached to the upper extremity of the lower tank supports are upper tank supports 70. They comprise elongated arms about one-half the length of the lower tank supports. Their lower end portions are contoured arcuately to conform to tank 18.

Hooks 72 depend from swivel connections to the upper ends of lower tank supports 68 for engaging tabs 22.

Lower reciprocative power means, such as first hydraulic cylinders 74 pivotally interengage mounting brackets 64 and lower tank supports 68 for pivotal movement of the latter. They join the lower tank supports at centrally located tabs 76. Preferably, control means for controlling the hydraulic cylinders includes a compensator valve or other feedback means (not shown) to insure that the hydraulic cylinders for both lower supports operate together.

Upon reciprocative power means, such as second hydraulic cylinders 78, pivotally interengage tabs 76 of the lower tank supports 68 and the upper extremities of the upper tank supports 70. Thus, the upper tank supports are pivotally movable relative to the lower tank supports 68. Again, control means (not shown) may be utilized to insure simultaneous operation.

In the operation of both embodiments of the tank carrier herein described, the tractor is driven to a position adjacent to a full anhydrous ammonia tank, with hooks 36 or 72 positioned above tabs 22.

In the embodiment shown in FIG. 1–7, hooks 36 are lowered to engage tabs 22 by activation of lifting cylinders 34. If a tank 18' having end tabs 22' is utilized, the lifting cylinders are pivoted on pins 38, as best shown in FIG. 6. After the hooks are engaged in the tabs, the lifting cylinders are activated to lift the tank from its lowered position, best shown in phantom lines in FIGS. 2 and 7, to a raised position adjacent tank supports 26, best shown in solid lines in FIGS. 2 and 7.

In the embodiment of FIGS. 1–5, clamp arms 42 are pivoted to their raised position by hydraulic cylinders 52. Thus, the arms are located below the tank, maintaining it against the contoured edges of tank supports 26. It will be noted that when the clamps are in their raised position, the tank is restrained from movement in all directions. This function is provided by the chains 54 in the embodiment of FIGS. 6 and 7.

In the embodiment shown in FIGS. 8 and 9, hooks 72 are lowered to engage tabs 22 by extending first hydraulic cylinder 74 to place the lower support arms 68 in their lowered position, as best shown in FIG. 8. After the hooks are engaged in the tabs 22, the hydraulic cylinders 74 are retracted to rotate the lower support arms counterclockwise to their raised position, as best shown in FIG. 9. Thus, tank 18 is raised, in manner analogous to cylinders 34, and is brought into engagement with the contoured edges of the lower supports 68.

Second hydraulic cylinders 78 are then extended to rotate the upper tank 70 clockwise to their lowered position against the tank, in manner analogous to clamp arms 42. Thus, the tank is rigidly secured between the tank supports 68 and 70.

In both embodiments the tank is provided with at least one outlet valve 80 to connection to an ammonia feed system 82 (FIG. 5). An outfeed conduit 84 is provided at its infeed end with a shut-off valve 86 and coupling 88 for connection to the outlet end of valve 80. The opposite end of conduit 84 communicates with branch conduits 90 (FIG. 1) associated with the ground-penetrating implements 14. Both valves 80 and 86 are closed until coupling 88 is secured, thereby preventing escape of ammonia from the tank. Thus, the danger of loss or injury from spillage is eliminated. Also, since no transfer of the ammonia from main supply tank 18 to one or more smaller tanks takes place as heretofore, there is no ammonia bleed loss involved.

Once the tank is connected to the ammonia feed system, as hereinbefore described, valves 80 and 86 are opened and plowing operation and ammonia plow down is undertaken in the normal fashion. Because the main ammonia supply tank is carried on the tractor rather than transferring ammonia to smaller, tractor-mounted tanks, the plowing time between tank changes is greatly increased.

It will be apparent to those skilled in the art that various changes may be made in the size, shape, type, number and arrangement of parts described hereinbefore, without departing from the spirit of this invention.

Having now described our invention and the manner in which it may be used, we claim:

1. An anhydrous ammonia tank carrier for use on a tractor capable of towing ground-working equipment at one end, the carrier comprising:
   a. a pair of laterally spaced, vertically extending tank support members having tank-securing bottom ends arranged for securing a tank therein against displacement in the longitudinal direction of travel of a tractor,
   b. mounting means on the tank support members arranged for attachment to a tractor at the end of the latter opposite the implement-towing end for positioning the laterally spaced tank support members to support a tank transversely across said end of the tractor,
   c. an extensible fluid pressure piston-cylinder unit mounted on each tank support member for vertical extension and retraction relative to said tank-engaging bottom ends, and
   d. connecting means on the bottom ends of the piston-cylinder units for connection to a tank to be carried, for raising the tank into engagement with the tank-securing bottom ends of the tank support members.

2. The tank carrier of claim 1 including retainer means on the mounting means arranged to engage under a tank in said secured position for retaining the tank therein against accidental displacement.

3. The tank carrier of claim 2 wherein the retainer means comprises a pair of clamp arms movable between an operative, extended position engaging the underside of a tank in said secured position and a retracted position away from the tank.

4. The tank carrier of claim 3 including a fluid pressure piston-cylinder unit interconnecting the mounting means and said pair of clamp arms for moving the latter between said extended and retracted positions.

5. The tank carrier of claim 2 wherein the retainer means comprises a pair of elongted, flexible lines arranged to engage the underside of tank in said secured position and to be attached at its opposite ends to the support members.

6. The tank carrier of claim 1 including pivot means mounting each piston-cylinder unit on its associated support member for adjusting the lateral positions of the connecting means relative to said support members.

* * * * *